US008231937B2

(12) United States Patent
Richardson et al.

(10) Patent No.: US 8,231,937 B2
(45) Date of Patent: *Jul. 31, 2012

(54) COMPARTMENTALIZED CHIPS WITH SIMILAR POLYMERS OF DIFFERENT VISCOSITIES FOR IMPROVED PROCESSABILITY

(75) Inventors: Delane Nagel Richardson, Medina, OH (US); Edwin A. Sisson, Medina, OH (US); Gianluca Ferrari, Venice (IT); Dan Gastaldo, Middleburg Heights, OH (US); Freddie L. Massey, Uniontown, OH (US)

(73) Assignee: M&G USA Corporation, Apple Grove, WV (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/178,920

(22) Filed: Jul. 8, 2011

(65) Prior Publication Data

US 2011/0266704 A1 Nov. 3, 2011

Related U.S. Application Data (62) Division of application No. 11/333,564, filed on Jan. 17, 2006, now Pat. No. 7,981,510.

(60) Provisional application No. 60/644,613, filed on Jan. 18, 2005, provisional application No. 60/646,329, filed on Jan. 24, 2005, provisional application No. 60/677,829, filed on May 5, 2005, provisional application No. 60/731,789, filed on Oct. 31, 2005, provisional application No. 60/644,622, filed on Jan. 18, 2005.

(51) Int. Cl.
*B32B 5/66* (2006.01)

(52) U.S. Cl. .................. 427/212; 427/213.36; 428/403; 428/407; 264/143; 264/330; 425/97

(58) Field of Classification Search .................. 428/403, 428/407; 264/143, 330; 425/97; 427/213.36, 427/212
See application file for complete search history.

(56) References Cited

U.S. PATENT DOCUMENTS

| 4,051,112 | A  | * | 9/1977 | Kuratsuji et al. | ............. 528/272 |
|---|---|---|---|---|---|
| 5,340,884 | A  |   | 8/1994 | Mills et al. | |
| 5,554,657 | A  |   | 9/1996 | Brownscombe et al. | |
| 5,747,548 | A  |   | 5/1998 | Bradt | |
| 5,876,644 | A  | * | 3/1999 | Nichols et al. | ................. 264/101 |
| 6,344,539 | B1 |   | 2/2002 | Palmer | |
| 6,406,766 | B1 |   | 6/2002 | Rotter et al. | |
| 6,669,986 | B1 | * | 12/2003 | Mushiake et al. | ............ 427/214 |
| 6,706,396 | B1 | * | 3/2004 | Hayes et al. | .................. 428/402 |
| 7,541,091 | B2 | * | 6/2009 | Sisson et al. | ................... 428/403 |
| 7,550,203 | B2 | * | 6/2009 | Ferrari et al. | .................. 428/403 |
| 7,816,008 | B2 | * | 10/2010 | Ferrari et al. | .................. 428/403 |
| 7,931,968 | B2 | * | 4/2011 | Richardson et al. | ........... 428/407 |
| 7,981,510 | B2 | * | 7/2011 | Richardson et al. | ........... 428/403 |
| 2005/0196566 | A1 |   | 9/2005 | Colhoun et al. | |
| 2007/0134495 | A1 |   | 6/2007 | Mori et al. | |

FOREIGN PATENT DOCUMENTS

| EP | 1063070 A3 | 1/2003 |
|---|---|---|
| EP | 1574538 A1 | 9/2005 |
| GB | 2424899 B | 10/2006 |
| WO | 2005/110694 A1 | 11/2005 |

OTHER PUBLICATIONS

Kiliman, Leszek, USPTO "Office Action for U.S. Appl. No. 11/333,564," Aug. 18, 2010.
Sisson, Edwin, "Response to Office Action for U.S. Appl. No. 11/333,564, Mailed Aug. 18, 2010," Nov. 17, 2010.
Kiliman, Leszek, USPTO "Final Office Action for U.S. Appl. No. 11/333,564," Feb. 4, 2011.
Sisson, Edwin, "Response After Final Office Action for U.S. Appl. No. 11/333,564, Mailed Feb. 4, 2011," Mar. 28, 2011.

* cited by examiner

*Primary Examiner* — Leszek Kiliman
(74) *Attorney, Agent, or Firm* — Edwin A. Sisson, Attorney at Law LLC (57) ABSTRACT

Compartmentalized chips of at least two chemically similar crystallizable thermoplastic polymers each having a different intrinsic viscosity placed in separate zones are disclosed. These compartmentalized chips exhibit thermal characteristics that are different from the traditional technique of homogeneously combining the two materials into the chip. These compartmentalized chips in their amorphous, crystalline and solid phase polymerized forms exhibit a longer crystallization half time than the homogeneous mixture, thus permitting faster injection cycle times when compared to an equivalent homogenous mixture.

15 Claims, 2 Drawing Sheets

COMPARTMENTALIZED CHIPS WITH SIMILAR POLYMERS OF DIFFERENT VISCOSITIES FOR IMPROVED PROCESSABILITY

PRIORITY AND CROSS REFERENCES

This patent application is a divisional patent application of U.S. Patent Non-Provisional patent application Ser. No. 11,333,564, filed on 17 Jan. 2006, now U.S. Pat. No. 7,981,510, claiming the benefit of the priority of U.S. Provisional Patent Application 60/644,613, filed Jan. 18, 2005; U.S. Provisional Patent Application 60/646,329, filed Jan. 24, 2005; U.S. Provisional Patent Application 60/677,829 filed May 5, 2005; U.S. Provisional Patent Application Ser. No. 60/731,789 filed Oct. 31, 2005, and U.S. Provisional Application Ser. No. 60/644,622 filed Jan. 18, 2005, the teachings of which are incorporated in their entirety. This application claims the benefit of priority of the 6 applications.

BACKGROUND OF THE INVENTION

1. Field of the Invention

The invention generally relates to a multi-component compartmentalized or zoned thermoplastic chip or pellet that provides a composition with a slower crystallization half time than homogenously dispersed chip of the same intrinsic viscosity. Said chip is useful in injection molding processes.

2. Related Art

In the injection molding process, polymer is injected into the mold with the thickest part usually being where the material is injected into the mold, called the tip. Because this tip will crystallize first, the part must be held into the mold long enough to cool it down to avoid crystallinity in the tip. If the polymer crystallizes slower, the part may be removed from the mold earlier, thus reducing the cycle time and improving the economics of the molding operation.

It is also advantageous to combine materials, such as postconsumer recycle polyester and virgin polyester, into one chip. However, when this is done as a homogeneous blend, the resulting polymer has a much faster crystallization rate (or lower crystallization half time). This increased rate of crystallinity lengthens the injection molding cycle time.

There is also the need for a way to combine two materials and achieve a more even Intrinsic Viscosity (I.V.) distribution, or reduced I.V. gradient, from the pellet's surface to the core. The advantages of more even I.V. distribution are described in United States Patent Application 2005/0196566, the teachings of which are incorporated by reference. The key advantages to having a more even IV distribution across the chip are less drop in molecular weight during extrusion and reduced energy consumption.

However, United States Patent Application 2005/0196566 achieves this by extruding a melt product having an Intrinsic Viscosity of 0.70 (dl/g) and then slightly increasing the I.V. via solid phase polymerization. While United States Patent Application 2005/0196566 contemplates the use of recycled polyester, it mentions nothing of combining it in the zoned or compartmentalized pellet structure.

There exists, therefore, the need to combine two similar polymers in a manner which can achieve a slower crystallization rate and provides the benefits of having a reduced I.V. gradient from the core to the surface.

SUMMARY OF THE INVENTION

This invention discloses a compartmentalized chip comprising a first compartment that comprises a first crystallizable thermoplastic polymer and a second compartment that comprises a second crystallizable thermoplastic polymer, wherein the second compartment is located so that at least a portion of the second compartment lies between the centroid of the chip and the first compartment and wherein the melt viscosity of the first crystallizable thermoplastic polymer is not the same as the melt viscosity of the second crystallizable thermoplastic polymer.

Further disclosed is that the first and second crystallizable thermoplastic resins are polyester, and that the resins may also be similar in that at least 85 mole percent of the polymeric repeating units of the second crystallizable thermoplastic resin are the same as the majority of the repeating units of the first crystallizable thermoplastic resin. The preferred embodiments are selected from the group consisting of crystallizable polyethylene terephthalate polymers.

It is also disclosed that the second crystallizable thermoplastic polymer is selected from the group consisting of industrial waste or postconsumer waste or be an FDA regulated postconsumer recycle polyester.

Also disclosed is that the second thermoplastic resin have a melt viscosity greater than the melt viscosity of the first thermoplastic resin.

Also disclosed is a process for manufacturing a pellet with a reduced I.V. gradient comprising the steps of 1) manufacturing a compartmentalized chip comprising a first compartment that comprises a first crystallizable thermoplastic polymer and a second compartment that comprises a second thermoplastic crystallizable polymer, wherein the second compartment is located so that at least a portion of the second compartment lies between the centroid of the chip and the first compartment, wherein the intrinsic viscosity of the second crystallizable thermoplastic polymer is greater than the intrinsic viscosity of the first crystallizable thermoplastic polymer, 2) Crystallizing the first crystallizable thermoplastic polymer, 3) Heating the compartmentalized chip in the presence of a driving force to a temperature in the range of 140° C. and the 1° C. below the temperature at which the first crystallizable polymer becomes liquid; and 4) Maintaining the chip in the temperature range in the presence of a driving force for sufficient time to increase the intrinsic viscosity of the chip at least 0.05 dl/g.

It is further disclosed that the process use a chip wherein at least 85% of the repeating polymer units of the second crystallizable thermoplastic polymer have the same chemical structure as at least 85% of the repeating units of the first crystallizable thermoplastic polymer, and/or wherein 85 percent of the polymer repeating units of the first crystallizable thermoplastic polymer are ethylene terephthalate.

It is even further disclosed that the second crystallizable thermoplastic polymer used in the process be selected from the group of thermoplastic polymers that have been a solid and remelted at least once since its original manufacture, industrial waste and postconsumer waste, postconsumer polyester, and FDA regulated postconsumer recycled polyester. It is further disclosed that at least 85% of the repeating polymer units of the second crystallizable thermoplastic polymer have the same chemical structure as at least 85% of the repeating units of the first crystallizable thermoplastic polymer. It is also disclosed that 85 percent of the polymer repeating units of the first crystallizable thermoplastic polymer used in the process are ethylene terephthalate.

It is also preferable that the second crystallizable thermoplastic polymer is selected from the group consisting of with at least 85% of the repeating polymer units of the second crystallizable thermoplastic polymer have the same chemical structure as at least 85% of the repeating units of the first crystallizable thermoplastic polymer or even further that 85% of the polymer repeating units of the first crystallizable thermoplastic polymer are ethylene terephthalate.

DETAILED DESCRIPTION OF THE INVENTION

The higher molecular weight polycondensation polymers are traditionally manufactured in a two step process. The melt process converts the raw materials to low molecular weight oligomers and then raises the molecular weight oligomers to a polymer by removing the reaction by-products from the liquid. The molecular weight, or intrinsic viscosity, is increased until the melt viscosity reaches the point where it is too physically or economically difficult to transport the liquid or rejuvenate the liquid surface for by-product removal. At this point the polymer is solidified into and cut into small granules, chips or chips, all of which are known as chips. The chips are then subjected to solid phase polymerization which increases the molecular weight of the material in the chip by exposing the chip to a temperature below the melt point of the polymer and an external driving force such as vacuum or inert gas. Typically, the temperature ranges from 140° C. to 1° C. below the temperature at which the chip becomes liquid, or the polymer melts.

The conventional chip as produced from the melt phase polymerization or extruder is homogenous with a very narrow molecular weight distribution (small I.V. gradient). The skin of the chip has the same molecular weight as the center of the chip. The intrachip intrinsic viscosity and subsequent melt viscosity variation can be determined by the tests described below which measure intrachip intrinsic viscosity variation.

In solid phase polymerization, the reaction by-products diffuse through the chip and then escape from the skin into an inert gas or vacuum. It has even been proposed that air be used as the driving force. Air is not preferred because the presence of the oxygen creates a competing reaction that degrades the surface melt viscosity and causes color in the polymer.

The solid phase polymerization reaction in the chip is initially kinetically controlled and rapidly moves to diffusion controlled with the polymerization of the material closer to the surface progressing faster than the polymerization of the inner material. Thus, unlike melt polymerization, solid phase polymerization creates a chip with a higher molecular weight material on the chip surface than exists in the chip center. Since melt viscosity increases as molecular weight (intrinsic viscosity) increases, the melt viscosity at the surface is greater than the melt viscosity in the core.

As solid phase polymerization designs have become more advanced, the industry has moved to increasingly lower and lower molecular weight in the melt chip. The lower the molecular weight of the melt, the longer the solid phase polymerization time required to reach the aggregate molecular weight as measured by intrinsic viscosity. It is critical to understand that intrinsic viscosity is merely the measure of the flow time of the known amount of chips dissolved into a predetermined amount of solvent. Thus in reality, the intrinsic viscosity measurement is only a surrogate for molecular weight. As demonstrated in the examples described below, two chips can have the same intrinsic viscosity (or flow time through an orifice when dissolved into a solvent) yet have an entirely different intrinsic viscosity distribution within the chip and therefore different thermal properties and melt viscosities. It is noted that the melt viscosity is measured by the time it takes the molten polymer composition to flow through an orifice, whereas intrinsic viscosity measures time for a solvated composition to flow through an orifice. The use of lower molecular weight feed creates a larger molecular weight differential from the core to the chip skin after the chip has been solid phase polymerized. In some cases, the molecular weight of the center of the chip can even remain unchanged. This molecular weight gradient and the melt viscosity of the chip are so great as to negatively affect the injection molding operation relative to chips produced from melt polymer with a higher molecular weight. The reason for the dramatic performance difference is that the melt viscosity increases exponentially with each increment in intrinsic viscosity.

The following tables demonstrate this effect on standard commercial homogenously dispersed resins. Table I shows the intrinsic viscosity of 1 gram of chips where the successive layers of the chips have been dissolved from the chips as described in the Test Method section. The theoretical zero shear melt viscosity of the polymer at that intrinsic viscosity is also listed. The molecular weight distribution in the chip may be characterized as the Delta Intrinsic Viscosity (dl/g), which is the Intrinsic Viscosity of the outer layer minus the Intrinsic Viscosity of the inner layer and the Zero Shear Melt Viscosity Ratio, which is the Zero Shear Melt Viscosity of the Surface layer divided by the Zero Shear Melt Viscosity of the Center. A larger Delta Intrinsic Viscosity (I.V.) indicates a much higher I.V. on the surface as does the larger Zero Shear Melt Viscosity Ratio. In contrast, the homogenously produced chip should have almost 0.0 Delta I.V. and Zero Shear Melt Viscosity Ratio of 1.0 immediately after melt manufacture and prior to solid phase polymerization.

TABLE I 1.0 GM CONCENTRIC WEIGHTS OF A POLYESTER STARTING FROM 0.58 (dl/g) MELT POLYMERIZED MATERIAL AND SOLID PHASE POLYMERIZED TO 0.81 (dl/g).

| Dissolution Time (min) | Wt. of Dissolved Sample (gm) | % of Initial 1 gm Sample Dissolved | Cumulative Wt % | Intrinsic Viscosity (dl/g) | Theoretical Zero Shear Melt Viscosity at 290° C. (1000 Poise) |
|---|---|---|---|---|---|
| 0.5 | 0.0451 | 4.45 | 4.45 | 0.914 | 15.2 |
| 1.0 | 0.0697 | 6.88 | 11.33 | 0.890 | 13.3 |
| 1.5 | 0.0865 | 8.53 | 19.86 | 0.886 | 13.0 |
| 3.0 | 0.1443 | 14.24 | 34.1 | 0.868 | 11.8 |
| 2.0 | 0.0920 | 9.08 | 43.18 | 0.860 | 10.6 |
| 2.0 | 0.0858 | 8.46 | 51.64 | 0.832 | 9.5 |
| 2.5 | 0.0981 | 9.68 | 61.32 | 0.807 | 8.1 |
| 2.8 | 0.0889 | 8.77 | 70.09 | 0.784 | 7.1 |
| 3.5 | 0.100 | 9.87 | 79.96 | 0.757 | 5.9 |
| 8.0 | 0.1265 | 12.48 | 92.44 | 0.789 | 7.3 |
| * | 0.0619 | 6.11 | 98.55 | 0.706 | 4.2 |

* There is no dissolution time for this sample as this is the amount remaining after the previous dissolutions.

Table II shows the impact of starting with various melt Intrinsic Viscosities and solid phase polymerizing the material to 0.81 and 0.84 dl/g. The lower the initial intrinsic viscosity and the higher the final intrinsic viscosity, the greater the intrinsic viscosity becomes on the surface and the greater the difference from surface to core.

TABLE II

INTRACHIP INTRINSIC VISCOSITY VARIATIONS
FROM DIFFERENT MELT INTRINSIC VISCOSITIES

| Starting melt I.V. (dl/g) | Final Composite I.V. (dl/g) | Surface I.V. (dl/g) | Center I.V. (dl/g) | Theoretical Surface Zero Shear Melt Viscosity at 290° C. (1000 Poise) | Theoretical Center Zero Shear Melt Viscosity at 290° C. (1000 Poise) | Delta IV (Surface − Center) | Zero Shear MV Ratio Surface to Center |
|---|---|---|---|---|---|---|---|
| 0.46 | 0.79  | 1.051 | 0.667 | 30.7 | 3.1 | 0.384 | 9.8  |
| 0.58 | 0.806 | 0.967 | 0.713 | 20.2 | 4.4 | 0.254 | 4.6  |
| 0.46 | 0.830 | 1.115 | 0.693 | 41.3 | 3.8 | 0.422 | 10.9 |
| 0.58 | 0.808 | 1.003 | 0.694 | 24.3 | 3.8 | 0.309 | 6.4  |

The gradient and associated high melt viscosity at the surface is reduced by extruding the chip from the melt reactor into a compartmentalized or zoned chip where the outer compartment or zone comprises a low molecular weight melt material and the inner compartment or zone comprises a similar polymer, but with a higher molecular weight or intrinsic viscosity. The phrase similar polymer is defined later but in general means that 85 percent of the polymer repeating units are the same.

It is often times also advantageous to combine two materials of the same chemical structure, such as in recycling operations. However, when combining the materials, one often creates a composition which crystallizes much faster than either of the two starting materials. Although not to be bound by any theory, it is postulated that this is due to the fact that the two separate entities homogenously dispersed throughout a chip act as nucleation agents for the other. This observation is demonstrated in Table III in the experimental section where the compartmentalized pellet has the a longer crystallization half time than the same composition in a homogeneously dispersed chip. It is also noted that the total amount of crystallinity is less for solid stated article of this invention, thus less energy is used to melt the material during the injection operation.

As described below, the following embodiments demonstrate how the compartmentalized or zoned structure overcomes the problems of producing a low molecular weight chip and solid phase polymerizing the chip to higher intrinsic viscosities; combining two materials into the same chip and achieving a slower crystallization half time than combining the materials homogenously dispersed throughout the chip.

The words chip, pellet and particle are used interchangeably. Preferred forms and/or sizes of for the chips are spherical with preferred diameters of 0.05 cm to 0.3 cm, hemispherical with a preferred maximum cross section of 0.1 cm to 0.6 cm, or right circular cylinders with a preferred diameter of 0.05 mm to 0.3 mm and a length of 0.1 cm to 0.6 cm. The chip is not to be confused with a fiber, which will have a large aspect ratio (long strand to diameter) of at least 15, with the aspect ratio of the chip being less than 15, more preferably less than 10.

U.S. Pat. Nos. 5,627,218 and 5,747,548, and U.S. Non-Provisional patent application Ser. No. 11/130,961 filed May 17, 2005, the teachings of which all three are incorporated herein, teach many techniques for manufacturing compartmentalized chips. In one embodiment, there are at least two zones, or regions in the chip, preferably a core and a sheath. In this, and all subsequent embodiments, the core-sheath with the sealed ends, as taught by U.S. Pat. No. 6,669,986, all the teachings of which are incorporated herein, is the preferred chip structure.

The core-sheath structure is obtained using two feeders. If a third annular ring is desired, an additional feeder is required. The feeder could be an extruder or a gear pump discharging the polymer from a melt reactor. Any suitable device which can force polymer into a nozzle will work. The first feeder supplies the liquid feed forming the core material which is linearly extruded at the center of the strand. At the same time, the sheath material is extruded in the second feeder into the sheath layer which concentrically covers the core. U.S. Pat. No. 6,669,986 discloses a multiple hole die apparatus to manufacture a core-sheath chip.

Figure 2:
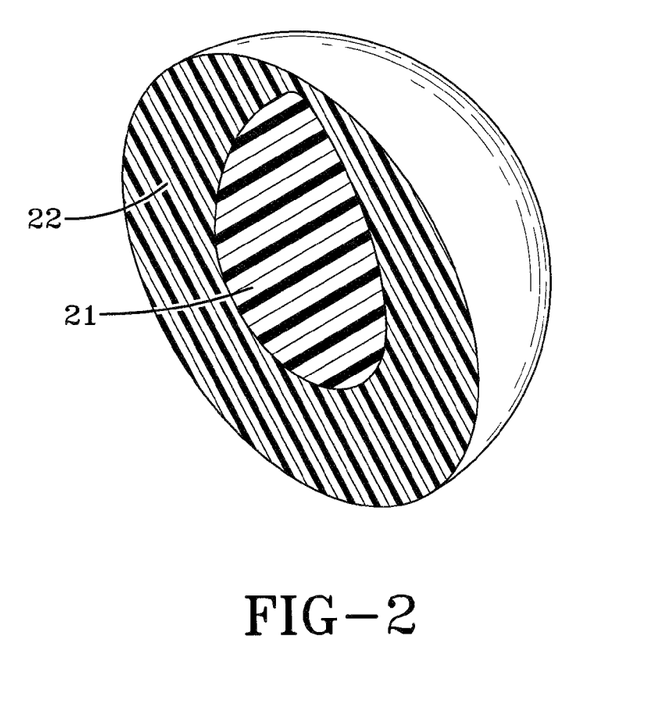
FIG. 2 depicts a resin pellet with two compartments or zones in the core-sheath configuration where the core is encapsulated, surrounded, or enclosed by an outer sheath layer.

A preferred embodiment as depicted in FIG. 2, is to close the ends of the pellet so the inner core 21 is completely surrounded and enclosed by a sheath 22. U.S. Pat. No. 6,669,986 teaches that THIS spherical or elliptical or disk-form multilayer chips with the overall circumference including the end face of the core material coated with sheath material can be made by rounding the cut end face. One way to make a chip with an outer layer sheath that encloses the contents of the inner layers is made by cutting the chip strand next to the die underwater.

Figure 4:
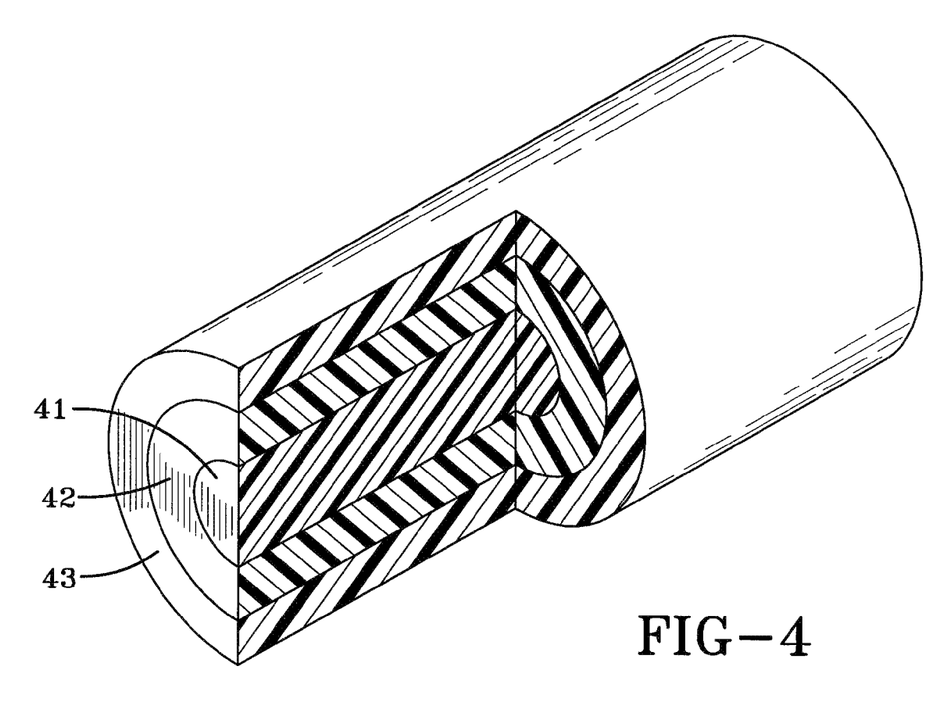
FIG. 4 depicts a resin pellet of three compartmentalized zones configured in two concentric layers surrounding a core.

It is apparent to one skilled in the art that the strand could consist of more than two annular concentric layers. This would be accomplished by using another feeder and a different die. FIG. 4 depicts this chip having 3 compartmentalized zones having a core 41 which is comprised of the higher intrinsic viscosity thermoplastic wherein the core is encased by an intermediate layer 42 which is comprised of a material, which is in turn surrounded by an outer layer 43 which is comprised of the lower weight thermoplastic can also be used.

The first step is to extrusion form a multilayer strand. The higher melt viscosity component is fed in the center of the chip and the lower melt viscosity component is extruded around the higher melt viscosity component. The extrusion-formed multilayer strand is cut before or after it is cooled as required and formed into multilayer chips.

For cooling, a general cooling means is adopted. For example, a method for immersing the multilayer strand into cooling water in the water tank is adopted. The water-cooled multilayer strand is preferably sent to the cutter after moisture adhering to the surface removed by a water dripping device.

The cutter cuts the multilayer strand into a specified length by driving a rotary knife, or the like. By cutting the multilayer strand as it is, double columnar form multilayer chips comprising a high melt viscosity core and a low melt viscosity sheath are obtained.

In general, multilayer chips with outside diameter of about 2 to 8 mm are manufactured.

It needs to be recognized that absolute separation of the compartmentalized zones is not essential. The lack of absolute separation is true for all embodiments of the invention.

Figure 3:
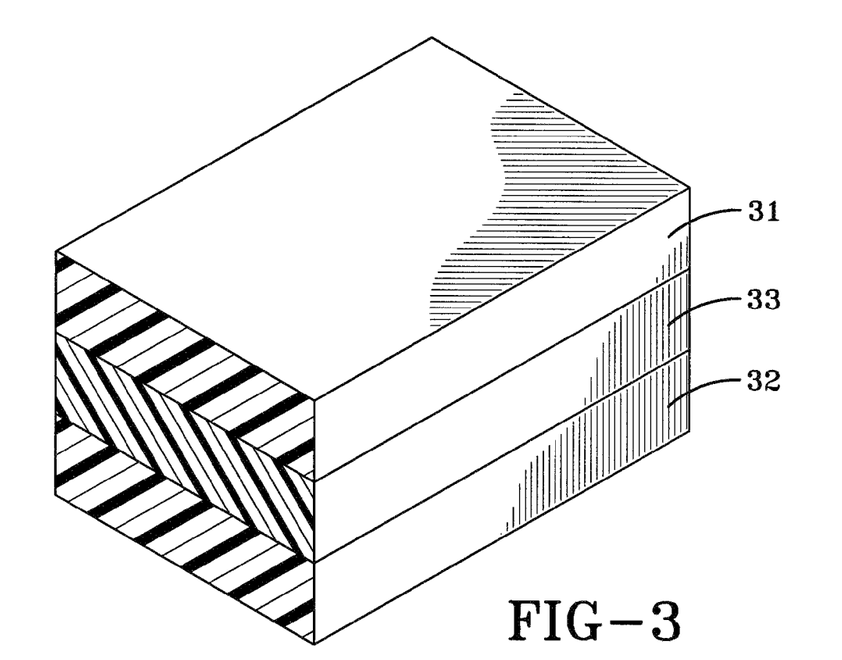
FIG. 3 depicts a resin pellet with three compartments or zones in a multi-layered or sandwich configuration.

The thermoplastic polymers can be cast into layered sheets that are then cut in a cube form as well. The minimum structure is two layers, but the preferred structure for a cast structure of this invention is depicted in FIG. 3. In the sandwich or layered construction there are at least three layers wherein the middle layer 33 is sandwiched between a first outer layer 31 and a second outer layer 32.

The core zone or compartment is a compartment of which a portion lies between the centroid of the chip and the zone with the greatest surface exposed surface that touches the air. The centroid of the chip is the center of the plane passing through the chip perpendicular to the extrusion direction of the strand from which the chip is cut. Usually this will be the longest dimension of the chip. It should be obvious that for the sphere, any plane will suffice.

Suitable thermoplastic polymers for use in the present invention include any crystallizable thermoplastic homopolymer or copolymer. The term crystallizable means that the thermoplastic polymer can be become semi-crystalline, either through orientation or heat induced crystallinity. It is well known that no plastic is completely crystalline and that the crystalline forms are more accurately described as semi-crystalline. The term semi-crystalline is well known in the prior art and is meant to describe a polymer that exhibits X-ray patterns that have sharp features of crystalline regions and diffuse features characteristic of amorphous regions. It is also well known in the art that semi-crystalline should be distinguished from the pure crystalline and amorphous states.

A crystallizable polymer will form crystals when the polymer is gradually cooled from the molten state. These crystals will generate diffraction observable by X-ray.

Preferably, the thermoplastic polymers used in the present invention comprise a polyester polymer which means a homopolymer or copolymer such as polyethylene terephthalate or crystallizable copolymer of polyethylene terephthalate. For clarity, the terms crystallizable polyethylene terephthalate, group consisting of crystallizable polyethylene terephthalates, refers to polymers which are crystallizable and comprised of at least 85% polyethylene terephthalate repeating segments. The remaining 15% may be any other combination of acid-glycol repeating units, provided that the resulting polymer is capable of achieving a degree of crystallinity of at least 5%, more preferably 10%.

The term crystallizable polyester refers to polymer which is crystallizable and at least 85% of its acid moieties are selected from the group consisting of terephthalic acid, 2,6 naphthalene dicarboxylic acid or their respective di-methyl esters.

In the preferred embodiment, the high and low melt viscosity materials are similar. Similar does not mean an exact formula replica. For example, a crystallizable polyethylene terephthalate homopolymer (100% of the repeating units being ethylene-terephthalate) could be placed in the core and a crystallizable polyethylene terephthalate copolymer (85 to almost 100% of the repeating units being ethylene-terephthalate and the remainder of the repeating units modified with different glycol-acid repeating units) placed into the sheath. The possible glycols include but are not limited to cyclohexane dimethanol, ethylene glycol, butane diol and the possible acids include but are not limited to isophthalic acid, 2,6 naphthalene dicarboxylic acid, sebacic acid or azelaic acid. Of course mixtures of the previous combinations are also envisioned.

For clarity, the use of the term polymer repeat unit refers the chemical structure which forms the main pattern of the reaction. For example, for polyesters, the unit is chemical structure formed by the reaction of the di-acid with the di-glycol. Therefore for polyethylene terephthalate, the repeating unit is the reaction product of terephthalic acid with ethylene glycol, or ethylene terephthalate. Often referred to as the "mer" from the word poly"mer", the repeating unit does not have the functional end groups attached as it has already been reacted into the polymer chain.

Specifically contemplated is that the high melt viscosity core comprise recycled industrial or postconsumer recycled polyester. Such material is often derived from used soft drink bottles and is commercially available throughout the world. To be recycled, the material has to have existed as a solid at least once prior to being extruded into the core. A core of postconsumer recycled polyester would be of variable composition representative of the resin used in packages at the time and would therefore contain a mixture of the various packaging polyesters in the market place.

While it is preferred that the core be void of non-crystallizable polyesters, it is possible that the postconsumer polyester may contain some limited amounts of non-crystallizable polyester. This presents little problem however as when the core is manufactured the crystallizable and non-crystallizable resins react with each other to create a crystallizable core composition. There exists therefore postconsumer recycled polyester void of non-crystallizable polyester and postconsumer recycled polyester containing non-crystallizable polyester. However, the postconsumer or industrial recycled polyester composition must still be crystallizable to be considered part of this invention.

A special type of postconsumer recycled polyester is the type known as FDA regulated postconsumer recycled polyester. The FDA is the United States Food and Drug Administration and is charged with promulgating regulations governing the use of plastics in food packaging. FDA regulated means that the postconsumer recycled polyester complies with the FDA regulations governing the use of the plastic in food and beverage packaging prior to being placed into the compartmentalized chip. To comply with the FDA regulations the resin must be of a suitable purity for use in food packaging as required with the Food Drug and Cosmetic Act as amended and implementing regulations. Some postconsumer recycled polyesters are manufactured using process that have been reviewed by the FDA and the FDA has issued that it judges the material from that process to be of suitable purity in accordance with 21 C.F.R 174.5, provided that it otherwise complies with 21 C.F.R 177.1630. This is often referred to as a "letter of no objection". These postconsumer recycled polyesters are also considered meeting the limitation of being FDA regulated and would be considered FDA regulated postconsumer recycled polyesters. It is important to understand that a regulated recycled postconsumer polyester can meet the requirements and be FDA regulated for the purposes of this specification and not have a "letter of no objection" as to the process used to clean the polyester.

It will be understood that the thermoplastic polymer suitable for use in the present invention can be made into a film, sheet, or injection molded article. The present invention is not limited to chips made from strands. For example, as revealed in U.S. Pat. No. 5,627,218, the thermoplastic polymers can be made into layered sheets that are then cut in a cube form as well. While the layered sheet structure may not work as well as the core-sheath construction, it is expected that placing the higher molecular weight material into a center layer would reduce the overall melt viscosity of the chips.

Polymers employed in the present invention can be prepared by conventional polymerization procedures well known in the art. The polyester polymers and copolymers may be prepared by melt phase polymerization involving the reaction of a diol with a dicarboxylic acid, or its corresponding diester. Various copolymers resulting from use of multiple diols and diacids may also be used. Polymers containing repeating units of only one chemical composition are homopolymers. Polymers with two or more chemically different repeat units in the same macromolecule are termed copolymers. For clarity, a polymer of terephthalate, isophthalate and naphthalate with ethylene glycol, diethylene glycol and cyclohexanedimethanol contains six distinct monomers and is considered a copolymer. The diversity of the repeat units depends on the number of different types of monomers present in the initial polymerization reaction. In the case of polyesters, copolymers include reacting one or more diols with a diacid or multiple diacids, and are sometimes also referred to as terpolymers.

Suitable dicarboxylic acids include those comprising from about 6 to about 40 carbon atoms. Specific dicarboxylic acids include, but are not limited to, terephthalic acid, isophthalic acid, 2,6 naphthalene dicarboxylic acid, cyclohexanedicarboxylic acid, cyclohexanediacetic acid, diphenyl-4,4'-dicarboxylic acid, 1,3-phenylenedioxydiacetic acid, 1,2-phenylenedioxydiacetic acid, 1,4-phenylenedioxydiacetic acid, succinic acid, glutaric acid, adipic acid, azelaic acid, sebacic acid, and the like. Specific esters include, but are not limited to, phthalic esters and naphthalic diesters.

These acids or esters may be reacted with an aliphatic diol having from about 2 to about 10 carbon atoms, a cycloaliphatic diol having from about 7 to about 14 carbon atoms, an aromatic diol having from about 6 to about 15 carbon atoms, or a glycol ether having from 4 to 10 carbon atoms. Suitable diols include, but are not limited to, 1,4-butenediol, trimethylene glycol, 1,6-hexanediol, 1,4-cyclohexanedimethanol, diethylene glycol, resorcinol, and hydroquinone.

Polyfunctional comonomers can also be used, typically in amounts of from about 0.1 to about 3 mole percent. Suitable comonomers include, but are not limited to, trimellitic anhydride, trimethylopropane, pyromellitic dianhydride (PMDA), and pentaerythritol. Polyester-forming polyacids or polyols can also be used. It is also possible to vary the rate of solid phase polymerization of one of the zones or compartments by placing the different levels of the polyfunctional comonomer into different zones.

One preferred polyester is selected from the group consisting of polyethylene terephthalate formed from the approximate 1:1 stoichiometric reaction of terephthalic acid, or its ester, with ethylene glycol. Another preferred polyester is selected from the group consisting of polyethylene naphthalate formed from the approximate 1:1 to 1:1.6 stoichiometric reaction of naphthalene dicarboxylic acid, or its ester, with ethylene glycol. Polybutylene terephthalate (PBT) is another preferred polyester. PET copolymers, PEN copolymers, and PBT copolymers are also preferred. Specific co- and terpolymers of interest are PET with combinations of isophthalic acid or its diester, 2,6 naphthalene dicarboxylic acid or its diester, and/or cyclohexane dimethanol.

The esterification or polycondensation reaction of the carboxylic acid or ester with glycol typically takes place in the presence of a catalyst. Suitable catalysts include, but are not limited to, antimony oxide, antimony triacetate, antimony ethylene glycolate, organomagnesium, tin oxide, titanium alkoxides, dibutyl tin dilaurate, and germanium oxide. These catalysts may be used in combination with zinc, manganese, or magnesium acetates or benzoates. Catalysts comprising antimony are preferred.

Polytrimethylene terephthalate (PTT) is another preferred polyester. It can be prepared by, for example, reacting 1,3-propanediol with at least one aromatic diacid or alkyl ester thereof. Preferred diacids and alkyl esters include terephthalic acid (TPA) or dimethyl terephthalate (DMT). Accordingly, the PTT preferably comprises at least about 80 mole percent of either TPA or DMT. Other diols which may be copolymerized in such a polyester include, for example, ethylene glycol, diethylene glycol, 1,4-cyclohexane dimethanol, and 1,4-butanediol. Aromatic and aliphatic acids which may be used simultaneously to make a copolymer include, for example, isophthalic acid and sebacic acid.

Preferred catalysts for preparing PTT include titanium and zirconium compounds. Suitable catalytic titanium compounds include, but are not limited to, titanium alkylates and their derivatives, titanium complex salts, titanium complexes with hydroxycarboxylic acids, titanium dioxide-silicon dioxide-co-precipitates, and hydrated alkaline-containing titanium dioxide. Specific examples include tetra-(2-ethylhexyl)-titanate, tetrastearyl titanate, diisopropoxy-bis(acetylacetonato)-titanium, di-n-butoxy-bis(triethanolaminato)-titanium, tributylmonoacetyltitanate, triisopropyl monoacetyltitanate, tetrabenzoic acid titanate, alkali titanium oxalates and malonates, potassium hexafluorotitanate, and titanium complexes with tartaric acid, citric acid or lactic acid. Preferred catalytic titanium compounds are titanium tetrabutylate and titanium tetraisopropylate. The corresponding zirconium compounds may also be used.

The preferred polymer of this invention may also contain small amounts of phosphorous compounds, such as phosphates, and a catalyst such as a cobalt compound, that tends to impart a blue hue. Other agents which may be included are infrared absorbers such as carbon black, graphite, and various iron compounds.

The melt phase polymerization described above may be followed by a crystallization step and then a solid phase polymerization (SSP) step to increase the molecular weight, as measured by intrinsic viscosity. The crystallization and polymerization may be performed in a tumbler dryer reaction in a batch-type system. Alternatively, the crystallization and polymerization can be accomplished in a continuous solid phase process whereby the polymer flows from one vessel to another after its predetermined thermal treatment in each vessel.

The crystallization conditions preferably include a temperature of from about 100° C. to about 150° C. The solid phase polymerization conditions preferably include a temperature of from about 200° C. to about 232° C., and more preferably from about 215° C. to about 232° C. The solid phase polymerization may be carried out for a time sufficient to raise the molecular weight to the desired level, which will depend upon the application. For a typical bottle application, the preferred molecular weight corresponds to an intrinsic viscosity from about 0.65 to about 1.0 deciliter/gram, as determined by ASTM D-4603-86 at 30° C. in a 60/40 by weight mixture of phenol and tetrachloroethane. The time required to reach this molecular weight may range from about 8 to about 45 hours.

In one embodiment, the chip can be made by extruding the core of a polymer strand from a crystallizable polyethylene terephthalate of 0.65 dl/g and extruding a sheath over the core from 95 to 5 percent by weight of the strand of a polyester prepolymer of 0.48 dl/g. The strand is then cut into solid core-sheath chips.

In another embodiment, the core can be derived from post-consumer recycled polyester. The important factor is that the melt viscosity of the polymer in the core be greater than the melt viscosity of the polymer in the sheath.

As demonstrated in the experimental data, the effect becomes less dramatic when less material is blended or placed into the core or the I.V. becomes closer to the I.V. of major composition.

Experimental

The following experiments demonstrate the utility of the compartmentalized pellet of the subject invention.

Figure 1:
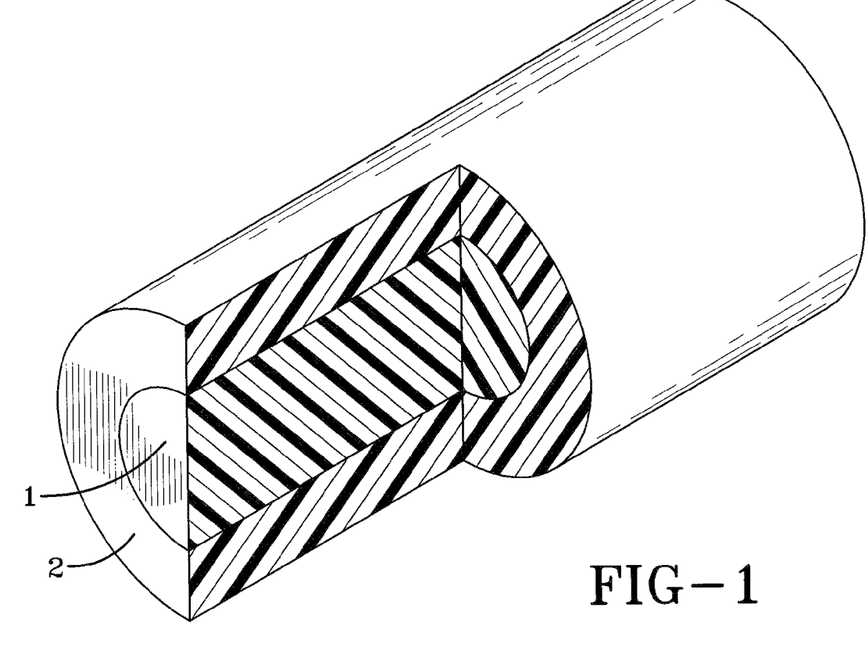
FIG. 1 depicts a resin pellet with two compartments or zones in the core-sheath configuration.

Various compartmentalized pellets were made in the core-sheath configuration described above (FIG. 1). Each compartmentalized pellet had a sheath consisting of a low molecular weight (I.V.=0.499 dl/g (0.50 dl/g)) crystallizable polyethylene terephthalate having 98.2 mole % terephthalic acid, 1.8 mole % isophthalic acid and a core of a higher molecular weight crystallizable polyethylene terephthalates consisting of 98.2 mole % terephthalic acid, 1.8 mole % isophthalic acid. The intrinsic viscosity and the amount of the material used in the core is found in the title of the data tables.

A comparative pellet without compartments was made wherein the two polyethylene terephthalate polymers of the same intrinsic viscosity and amount used in the compartmentalized pellet were homogeneously dispersed one into the other. The samples were not analyzed for any degree of chemical interaction or transesterification.

Each sample was then crystallized for one hour by maintaining exposure to a nitrogen flow heated 178° C.

The pellets were then subjected to solid phase polymerization conditions by placing the pellets on a frit in a vertical tube. The tube was placed in a hot oil bath. Nitrogen was heated to the oil temperature by passing it through a set of coils immersed in the hot oil bath and then introduced into the bottom of the vertical tube underneath the frit. The hot nitrogen then passed through the frit and into the pellets, exiting out the top of the vertical tube. Samples were taken at the interval times indicated.

Solid phase polymerization was done at two temperatures (215° C. and 230° C.). Pellet samples were taken as close to the time indicated. The whole pellet was analyzed by DSC for intrinsic viscosity, level of crystallinity and crystallization half time.

As can be seen, in virtually all cases the crystallization half time of the homogenously dispersed pellet was less than the crystallization half time of the same composition in the zoned pellet.

As would be expected, the effect becomes less dramatic when less material is blended or placed into the core or the I.V. becomes closer to the I.V. of major composition. Thus the invention can be considered as any amount in the core, so long as the I.V. is different from that of the sheath.

In one embodiment, the I.V. (melt viscosity) of the material in the core is greater the I.V. of the material in the sheath. This embodiment describes the pellet immediately after it is first made, for example, by placing virgin polyester from a melt reactor in the sheath and postconsumer recycled polyester in the core. The greater the amount of material in the core, the greater the difference from the homogenous dispersion control becomes. While the effect is not so great at low amounts of material in the core, the effect would still occur at even 5% in the core. Therefore the core may be as small as 1 percent by volume of the pellet, preferably at least 5%, with 10% or more preferred for the desired effect. The maximum volume would be less than 50% because at 50% the core ceases to be a minor component.

This embodiment is depicted by the pellets in the experimental section immediately after they are made and are still amorphous and by the same pellets after crystallization, but before significant solid phase polymerization.

Another embodiment disclosed is a pellet wherein the material in the core has an I.V. less than the I.V. of the sheath. After solid phase polymerization, the intrinsic viscosity of the material in the sheath has increased so that the it is greater than the intrinsic viscosity of the material in the core. However, as shown in Table VII, the reduction in I.V. gradient is demonstrated by solid phase polymerizing the compartmentalized pellet having a core with a higher molecular weight than the sheath.

TABLE III

25% 0.84 dl/g polyester, 75% 0.499 dl/g polyester

| | SSP Temperature = 215° C. | | | | | | SSP Temperature = 230° C. | | | | | |
|---|---|---|---|---|---|---|---|---|---|---|---|---|
| SSP Time at Temperature | Intrinsic Viscosity (dl/gm) | | Crystallinity (%) | | Crystallization ½ Time (sec) | | Intrinsic Viscosity (dl/gm) | | Crystallinity (%) | | Crystallization ½ Time (sec) | |
| Indicated (hrs) | Zoned | Control | Zoned | Control | Zoned | Control | Zoned | Control | Zoned | Control | Zoned | Control |
| 0 | 0.585 | 0.552 | 23.1 | 28.5 | 54.4 | 48.8 | 0.574 | 0.546 | 26.5 | 25.9 | 72 | 48.9 |
| 1.5 | 0.616 | 0.575 | 31.2 | 33.1 | 57.9 | 49.4 | 0.66 | 0.634 | 33.4 | 34.7 | 61.4 | 51 |
| 3 | 0.661 | 0.626 | 28.6 | 38.4 | 59.8 | 52.8 | 0.787 | 0.754 | 39.3 | 34.9 | 65.8 | 56.2 |
| 4.5 | 0.708 | 0.698 | 36.8 | 35 | 63.7 | 52.7 | 0.879 | 0.855 | 37.7 | 37.5 | 73 | 62.7 |
| 6 | 0.751 | 0.718 | 30.4 | 39.4 | 65.8 | 55.1 | 0.932 | 0.925 | 36.8 | 34.5 | 75.7 | 62.7 |
| 8 | 0.764 | 0.803 | 39.8 | 34.2 | 57.1 | 84.4 | 1.036 | 1.035 | 36 | 39.9 | 78.3 | 67.2 |
| 10 | 0.869 | 0.824 | 32.2 | 37.3 | 78.5 | 60.1 | 1.111 | 1.11 | 37.1 | 38.5 | 90.7 | 75.5 |
| 12 | 0.884 | 0.861 | 34.1 | 36.6 | 67.4 | 61.3 | 1.165 | 1.176 | 38 | 39.6 | 83.6 | 75.2 |
| 14 | 0.932 | 0.9 | 39.8 | 34.4 | 75.7 | 64.3 | | | | | | |
| 16 | 0.963 | 0.932 | 35.7 | 39.5 | 75.6 | 65.1 | | | | | | |
| 18 | 1.012 | 0.979 | 39.7 | 35 | 82.8 | 71.5 | | | | | | |
| 20 | 1.021 | 1.028 | 40 | 39.1 | 76.9 | 73 | | | | | | |
| 22 | 1.065 | 1.066 | 38.3 | 41 | 89.2 | 75.7 | | | | | | |
| 24 | 1.101 | 1.105 | 37.1 | 39.3 | 91 | 80.5 | | | | | | |

TABLE IV

10% 0.84 dl/g polyester, 90% 0.499 dl/g polyester

| | SSP Temperature = 215° C. | | | | | | SSP Temperature = 230° C. | | | | | |
|---|---|---|---|---|---|---|---|---|---|---|---|---|
| SSP Time at Temperature | Intrinsic Viscosity (dl/gm) | | Crystallinity (%) | | Crystallization ½ Time (sec) | | Intrinsic Viscosity (dl/gm) | | Crystallinity (%) | | Crystallization ½ Time (sec) | |
| Indicated (hrs) | Zoned | Control | Zoned | Control | Zoned | Control | Zoned | Control | Zoned | Control | Zoned | Control |
| 0 | 0.544 | 0.513 | 28.8 | 29.3 | 52.4 | 49.5 | 0.539 | 0.514 | 29.6 | 29.3 | 53.2 | 51.9 |
| 1.5 | 0.583 | 0.55 | 34.8 | 36.9 | 55.8 | 50.6 | 0.688 | 0.66 | 39.4 | 36.9 | 59.5 | 49.5 |
| 3 | 0.629 | 0.599 | 35.6 | 37.1 | 58.2 | 53.7 | 0.725 | 0.739 | 38.8 | 37.7 | 61.9 | 50.6 |
| 4.5 | 0.671 | 0.646 | 35.9 | 37.7 | 59.4 | 53.5 | 0.788 | 0.781 | 40.9 | 53.5 | 66.4 | 56.8 |
| 6 | 0.708 | 0.687 | 36.6 | 30 | 58.5 | 56.2 | 0.902 | 0.896 | 39.3 | 38.3 | 70.4 | 53.5 |
| 8 | 0.757 | 0.72 | 28.4 | 39.6 | 60.6 | 55.4 | 0.998 | 1.023 | 41.8 | 55.4 | 75.2 | 69.3 |
| 10 | 0.812 | 0.807 | 34.7 | 38.7 | 67.4 | 59.2 | 1.101 | 1.159 | 41.2 | 41.7 | 80.6 | 55.4 |
| 12 | 0.86 | 0.847 | 40.7 | 37.9 | 68.2 | 63.3 | 1.141 | 1.156 | 40.4 | 40.3 | 83.5 | 78 |
| 14 | 0.894 | 0.879 | 31.2 | 38.8 | 70.4 | 65.8 | | | | | | |
| 16 | 0.918 | 0.943 | 40.4 | 35.4 | 71.2 | 70.4 | | | | | | |
| 18 | 0.954 | 0.961 | 38.8 | 38.8 | 76.4 | 71.5 | | | | | | |
| 20 | 0.993 | 1.002 | 38.9 | 39 | 74.2 | 77.6 | | | | | | |
| 22 | 1.012 | 1.05 | 37 | 39.9 | 78.2 | 77.4 | | | | | | |
| 24 | 1.038 | 1.082 | 37.3 | 36.7 | 76.9 | 80.3 | | | | | | |

TABLE V

10% 0.72 dl/g polyester, 90% 0.499 dl/g polyester

| | SSP Temperature = 215° C. | | | | | | SSP Temperature = 230° C. | | | | | |
|---|---|---|---|---|---|---|---|---|---|---|---|---|
| SSP Time at Temperature | Intrinsic Viscosity (dl/gm) | | Crystallinity (%) | | Crystallization ½ Time (sec) | | Intrinsic Viscosity (dl/gm) | | Crystallinity (%) | | Crystallization ½ Time (sec) | |
| Indicated (hrs) | Zoned | Control | Zoned | Control | Zoned | Control | Zoned | Control | Zoned | Control | Zoned | Control |
| 0 | 0.533 | 0.521 | 28.7 | 27.2 | 51.7 | 48.8 | 52.8 | 0.513 | 30.7 | 27 | 52.8 | 51.7 |
| 1.5 | 0.577 | 0.56 | 34 | 36 | 55.6 | 50.3 | 0.612 | 0.631 | 38.6 | 38.7 | 57.8 | 86.8 |
| 3 | 0.623 | 0.611 | 35.8 | 36.9 | 56.4 | 51.3 | 0.715 | 0.721 | 39.4 | 39.1 | 62.6 | 54.9 |
| 4.5 | 0.671 | 0.666 | 37.1 | 38.5 | 59.1 | 52.3 | 0.805 | 0.849 | 39.9 | 40 | 67.9 | 61.2 |
| 6 | 0.711 | 0.692 | 37.6 | 37.9 | 62.4 | 54.8 | 0 | 0.985 | 0 | 39.6 | 0 | 64.2 |
| 8 | 0.758 | 0.744 | 39 | 25.4 | 63.8 | 96.4 | 1 | 0.995 | 39.8 | 41.5 | 71.7 | 65.8 |
| 10 | 0.793 | 0.792 | 39.8 | 38.7 | 64.9 | 80.2 | 0 | 1.089 | 0 | 40 | 0 | 73.8 |
| 12 | 0.854 | 0.826 | 39.6 | 41.4 | 65.1 | 68.8 | 1.133 | 1.185 | 40.9 | 43.2 | 83.1 | 81.6 |
| 14 | 0.884 | 0.888 | 40.6 | 39.6 | 69.2 | 68.1 | | | | | | |
| 16 | 0.928 | 0.935 | 40.7 | 40.4 | 71.9 | 68.1 | | | | | | |
| 18 | 0.961 | 0.961 | 39.5 | 38.2 | 69.5 | 66.5 | | | | | | |
| 20 | 1.002 | 0.992 | 39.6 | 41.2 | 69.5 | 74.2 | | | | | | |
| 22 | 1.027 | 1.073 | 42.9 | 42.2 | 76.1 | 73.3 | | | | | | |
| 24 | 1.052 | 1.087 | 0 | 37.9 | 74.5 | 74.6 | | | | | | |

TABLE VI

REDUCTION OF I.V. GRADIENT

| | CHIP COMPOSITE I.V. (dl/g) | | CENTER I.V. (dl/g) | | SURFACE I.V. (dl/g) | |
|---|---|---|---|---|---|---|
| | Blend | Compartmentalized | Blend | Compartmentalized | Blend | Compartmentalized |
| 10% 0.72 dl/g polyester, 90% 0.499 dl/g polyester SSP: 2300° C., 6 hr | 0.89 | 0.92 | 0.76 | 0.751 | 1.24 | 1.03 |
| 25% 0.84 dl/g polyester, 75% 0.499 dl/g polyester SSP: 230° C., 6 hr | 0.95 | 0.97 | 0.74 | 0.850 | 1.32 | 1.23 |
| 10% 0.72 dl/g polyester, 90% 0.499 dl/g polyester SSP: 215° C., 10 hr | 0.80 | 0.83 | 0.69 | 0.73 | 1.01 | 1.07 |

TABLE VI-continued

REDUCTION OF I.V. GRADIENT

| | CHIP COMPOSITE I.V. (dl/g) | | CENTER I.V. (dl/g) | | SURFACE I.V. (dl/g) | |
|---|---|---|---|---|---|---|
| | Blend | Compart-mentalized | Blend | Compart-mentalized | Blend | Compart-mentalized |
| 25% 0.84 dl/g polyester, 75% 0.499 dl/g polyester SSP: 215° C., 10 hr | 0.83 | 0.85 | 0.71 | 0.85 | 1.24 | 1.09 |

1. CENTER I.V. is the I.V. based upon the remaining amount of polymer after 89-95% of the pellet has been dissolved.
2. SURFACE I.V. is the I.V. of the first 5-10% of the pellet has been dissolved.
I.V. is the average of three runs except for the surface value of 1.03 which is the average of two runs.

Test Methods
Determination of Intrachip Intrinsic Viscosity

There are two ways to determine the intrachip Intrinsic Viscosity. In one procedure different, consecutive samples consisting of 1.0 g. of chips of a particular product are exposed to 50/50 mixture of trifluoroacetic Acid/Dichloromethane for increasing amounts of time resulting in more and more of each of the 1.0 g. of chips being dissolved. The dissolved portion is then analyzed for its Intrinsic Viscosity. This produces Intrinsic Viscosity data for the surface and then ever increasing wt. fractions of the chips. The Intrinsic Viscosity data thus start out high (surface Intrinsic Viscosity) and approach the Intrinsic Viscosity of the sample as a whole, called the composite Intrinsic Viscosity. The Intrinsic Viscosity for each successive, concentric layer can be calculated from a weighted average, which unfortunately becomes inaccurate close to the center. This is because there are only very small differences in the Intrinsic Viscosity data for the fractions towards the center. This inaccuracy can be overcome by actual measurements of the center fractions. The advantage of this procedure is that multiple 1.0 g. samples are used giving a much more representative description of the product being analyzed. This is important for aggregate products that have a large chip to chip Intrinsic Viscosity variation and where 1 g. of chips is not representative.

The other approach is to peel the layers away. Peeling was accomplished by exposing the same 1.0 g. of chips of a given product to the solvent used in the Intrinsic Viscosity test at the same temperature, generally for the same amount of time in succession, resulting in layers of the chips being dissolved away. The technique produces a series of Intrinsic Viscositys showing the Intrinsic Viscosity variation for each of the successive layers. This procedure has the benefit of giving the Intrinsic Viscosity of each layer and is more accurate for the inner layers. However, it has the disadvantage of providing data for only 1.0 g. of sample.

There are different techniques for treating the dissolved portion. One is to precipitate the material from the solvent, the other is to analyze the solution directly. Direct analysis of the dissolved portion is preferred because precipitation of the dissolved portion introduces extra steps and a low molecular weight fraction may tend to be lost Isolation of the undissolved fraction is more difficult for PET when compared to polyethylene naphthalate (PEN), due to the easier solubility of the PET. The undissolved chips can be isolated by filtration through a 325 mesh screen and then immediately transferred to a Teflon coated aluminum foil tray. The tray is weighed before and after transfer and weighed again when the undissolved chips are removed. Generally, nothing remains in the tray. The PET or PEN chips need to be separated on the tray to ensure that they would separate quickly once put back into the solvent. The chips retain their shape throughout the dissolution process. There is usually no indication of pitting or other uneven attack by the solvent.

Solvent removal from undissolved portions of chip samples is accomplished by filtering the chips from the solvent using a 325 mesh screen, rinsing, and drying for 30 mins. on a hotplate with a surface temperature of 150° C. Extended drying times, plus additional drying in a vacuum oven at 150° C. can be done, but generally show no change in weight.

Melt Viscosity

The melt viscosity can be determined by any number of techniques in the industry. The temperature of the melt viscosity is taken at 40° C. above the melt point of the chip. For a chip with two or more polymers, the temperature of the melt viscosity measurement is done at 40° C. above the melt point of the highest melting polymer. For example, the melt viscosity of chip made from a copolyethylene terephthalate of two different melt viscosity would have the melting point of the copolyethylene terephthalate, which is approximately 248-252° C., as measured by Differential Scanning calorimetry with a scanning rate of 10° C. per minute. The melt viscosity of a chip with both polymers melting at 246° C. would be measured at 286° C.

Alternatively the melt viscosity of chip comprised of a copolyethylene terephthalate having a melting point of 246° C. and a polyethylene terephthalate homopolymer having a melting point of 265° C. would be measured 305° C.

Intrinsic Viscosity

The intrinsic viscosity of intermediate molecular weight and low crystalline poly(ethylene terephthalate) and related polymers which are soluble in 60/40 phenol/tetrachloroethane was determined by dissolving 0.1 gms of polymer or ground pellet into 25 ml of 60/40 phenol/tetrachloroethane solution and determining the viscosity of the solution at 30° C.+/−0.05 relative to the solvent at the same temperature using a Ubbelohde 1B viscometer. The intrinsic viscosity is calculated using the Billmeyer equation based upon the relative viscosity.

The intrinsic viscosity of high molecular weight or highly crystalline poly(ethylene terephthalate) and related polymers which are not soluble in phenol/tetrachloroethane was determined by dissolving 0.1 gms of polymer or ground pellet into 25 ml of 50/50 trifluoroacetic Acid/Dichloromethane and determining the viscosity of the solution at 30° C.+/−0.05 relative to the solvent at the same temperature using a Type OC Ubbelohde viscometer. The intrinsic viscosity is calculated using the Billmeyer equation and converted using a linear regression to obtain results which are consistent with those obtained using 60/40 phenol/tetrachloroethane solvent. The linear regression is $$IV \text{ in } 60/40 \text{ phenol/tetrachloroethane} = 0.8229 \times IV \text{ in } 50/50 \text{ trifluoroacetic Acid/Dichloromethane} + 0.0124$$

All the measurements of intrinsic viscosity of the resins in tables II-IV were measured using the method for the high molecular weight polyesters.

I.V. Determination of Outer and Inner 10% of the Pellets

The outer 10% of the pellets were analyzed as follows. Three, 325 mesh screens were folded into a funnel shape, rinsed with 20-30 ml. of filtered dichloromethane, dried on the hotplate for at least 10 minutes, and tared to constant weight.

1 g. of pellets or chips were weighed into each of three, 25-ml volumetric flasks without stirring bars.

5 ml of filtered, I.V. solvent from the IV determination method were added to a flask with the funnels containing the tared 325-mesh screens and swirled gently for 0.5 to 1 minute. The time will vary from sample to sample and some experimentation may be needed to determine the correct time to yield 5 to 11% of the surface of the sample in solution.

The solvent and undissolved pellets were transferred to the tared flasks through the filter screen. The solvent was allowed to completely drain and touch the lip of the flask to the screen several times. The screen was transferred to a wire holder on a hotplate set to 150° C. surface temperature to dry for about 5 minutes.

The flask was quickly rinsed four times with about 5 ml of filtered solvent with the rinses transferred to the tared flask through the funnel, rinsing all the surface of the funnel.

The tared flask was immediately sealed with a stopper and set aside for I.V. measurement. After staying in the wire holder for 5 mins, the screen was transferred to an aluminum tare pan on the surface of the hotplate and dried for at least 30 minutes.

The flask was weighed to determine the weight of solvent and IV's determined the usual manner described earlier. When the undissolved sample was dried, it was weighed to determine the weight of undissolved pellets, and the weight of the dissolved fraction was determined by difference.

The I.V. of inner 10% of the pellets was determined as follows: Three, 325 mesh screens were folded into a funnel shape, rinsed with 20-30 ml. of filtered dichloromethane, dried on the hotplate for at least 10 minutes, and tared to constant weight.

1 g. of pellets was weighed into each of three 25-ml volumetric flasks with stirring bars.

12 ml. of filtered IV solvent from the IV method was added to one flask and stirred until 89 to 95% of the pellets were dissolved. If the weight was not in the range, the sample was repeated. The solvent and undissolved pellets were transferred to the filter flask through the filter screen.

Rinse the volumetric flask with about 5 ml. of filtered solvent, transferring the rinse through the screen. Repeat if necessary to transfer all of the undissolved sample to the screen.

The undissolved pellets and the entire surface of the screen were immediately rinsed with about 20 ml. of filtered dichloromethane.

The screen was transferred to an aluminum tare pan on the surface of the hotplate (150° C.), allowed to dry for at least 30 minutes, and then cooled to room temperature before weighing.

The screen was weighed and the weight of undissolved pellets determined. The IV of the undissolved pellets were determined in the usual manner using the method disclosed earlier.

The invention claimed is:

1. A process for manufacturing a pellet with a reduced I.V. gradient comprising the steps of:
   (A) manufacturing a compartmentalized chip comprising a first compartment that comprises a first crystallizable thermoplastic polymer and a second compartment that comprises a second thermoplastic crystallizable polymer, wherein the second compartment is located so that at least a portion of the second compartment lies between the centroid of the chip and the first compartment, wherein the intrinsic viscosity of the second crystallizable thermoplastic polymer is greater than the intrinsic viscosity of the first crystallizable thermoplastic polymer;
   (B) crystallizing the first crystallizable thermoplastic polymer;
   (C) heating the compartmentalized chip in the presence of a driving force to a temperature in the range of 140° C. and the 1° C. below the temperature at which the first crystallizable polymer becomes liquid;
   (D) maintaining the chip in the temperature range in the presence of a driving force for sufficient time to increase the intrinsic viscosity of the chip at least 0.05 dl/g.

2. The process of claim 1 wherein at least 85 percent of the repeating polymer units of the second crystallizable thermoplastic polymer have the same chemical structure as at least 85 percent of the repeating units of the first crystallizable thermoplastic polymer.

3. The process of claim 1, wherein 85 percent of the polymer repeating units of the first crystallizable thermoplastic polymer are ethylene terephthalate.

4. The process of claim 1, wherein the second crystallizable thermoplastic polymer has been a solid and remelted at least once since its original manufacture.

5. The process of claim 4 wherein at least 85 percent of the repeating polymer units of the second crystallizable thermoplastic polymer have the same chemical structure as at least 85 percent of the repeating units of the first crystallizable thermoplastic polymer.

6. The process of claim 4, wherein 85 percent of the polymer repeating units of the first crystallizable thermoplastic polymer are ethylene terephthalate.

7. The process of claim 1, wherein the second crystallizable thermoplastic polymer is selected from the group consisting of industrial waste and postconsumer waste.

8. The process of claim 7 wherein at least 85 percent of the repeating polymer units of the second crystallizable thermoplastic polymer have the same chemical structure as at least 85 percent of the repeating units of the first crystallizable thermoplastic polymer.

9. The process of claim 7, wherein 85 percent of the polymer repeating units of the first crystallizable thermoplastic polymer are ethylene terephthalate.

10. The process of claim 1, wherein the second crystallizable thermoplastic polymer is postconsumer polyester.

11. The process of claim 10 wherein at least 85 percent of the repeating polymer units of the second crystallizable thermoplastic polymer have the same chemical structure as at least 85 percent of the repeating units of the first crystallizable thermoplastic polymer.

12. The process of claim 11, wherein 85 percent of the polymer repeating units of the first crystallizable thermoplastic polymer are ethylene terephthalate.

13. The process of claim 1, wherein the second crystallizable thermoplastic polymer is FDA regulated postconsumer recycle polyester.

14. The process of claim 13 wherein at least 85 percent of the repeating polymer units of the second crystallizable thermoplastic polymer have the same chemical structure as at least 85 percent of the repeating units of the first crystallizable thermoplastic polymer.

15. The process of claim 13, wherein 85 percent of the polymer repeating units of the first crystallizable thermoplastic polymer are ethylene terephthalate.

* * * * *